United States Patent
Engler et al.

(10) Patent No.: US 10,489,237 B2
(45) Date of Patent: Nov. 26, 2019

(54) FLUSHING DATA CONTENT IN RESPONSE TO A POWER LOSS EVENT TO A PROCESSOR

(71) Applicant: HEWLETT PACKARD ENTERPRISE DEVELOPMENT LP, Houston, TX (US)

(72) Inventors: David Engler, Houston, TX (US); Mark Kapoor, Houston, TX (US); Patrick Raymond, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 222 days.

(21) Appl. No.: 15/535,669

(22) PCT Filed: Dec. 19, 2014

(86) PCT No.: PCT/US2014/071673
§ 371 (c)(1),
(2) Date: Jul. 6, 2017

(87) PCT Pub. No.: WO2016/099567
PCT Pub. Date: Jun. 23, 2016

(65) Prior Publication Data
US 2017/0337102 A1    Nov. 23, 2017

(51) Int. Cl.
*G06F 11/00*     (2006.01)
*G06F 11/07*     (2006.01)
(Continued)

(52) U.S. Cl.
CPC ............ *G06F 11/0793* (2013.01); *G06F 1/28* (2013.01); *G06F 1/30* (2013.01); *G06F 11/073* (2013.01);
(Continued)

(58) Field of Classification Search
CPC .................................................. G06F 11/0793
(Continued)

(56) References Cited

U.S. PATENT DOCUMENTS 7,954,006 B1    5/2011   Mangipudi
8,024,516 B2    9/2011   Miura
(Continued)

FOREIGN PATENT DOCUMENTS

| TW | 526491 | 4/2003 |
| TW | 569219 | 1/2004 |
| TW | 201413488 | 4/2014 |

OTHER PUBLICATIONS

Li, Y et al., Concurrent Autonomous Self-test for Uncore Components in System-on-chips, (Research Paper), Apr. 19-22, 2010, 2 Pages.
Narayanan, D. et al., Whole-system Persistence, (Research Paper), Mar. 3-7, 2012, 10 Pages.

*Primary Examiner* — Dieu Minh T Le
(74) *Attorney, Agent, or Firm* — Nolte Intellectual Property Law Group

(57) ABSTRACT

In one example, a processor may include a processor core with a central processing unit as well as a processor cache separate from the processor core. The processor may also include flushing circuitry. The flushing circuitry may identify a power loss event for the processor. In response, the flushing circuitry may selectively power the processor by providing power to the processor cache but not to the processor core. The flushing circuitry may further flush data content of the processor cache to a non-volatile memory separate from the processor.

15 Claims, 7 Drawing Sheets

(51) Int. Cl.
  *G06F 12/00*    (2006.01)
  *G06F 1/28*     (2006.01)
  *G06F 1/30*     (2006.01)
  *G06F 12/0802*  (2016.01)
  *G06F 12/0868*  (2016.01)

(52) U.S. Cl.
  CPC .......... *G06F 12/00* (2013.01); *G06F 12/0802* (2013.01); *G06F 12/0868* (2013.01); *G06F 2212/1032* (2013.01); *G06F 2212/214* (2013.01); *G06F 2212/311* (2013.01); *Y02D 10/13* (2018.01)

(58) Field of Classification Search
  USPC .............................. 714/14, 10, 11, 12, 13, 22
  See application file for complete search history.

(56) References Cited

U.S. PATENT DOCUMENTS

| | | |
|---|---|---|
| 8,169,839 B2 | 5/2012 | Moshayedi et al. |
| 8,607,076 B2 | 12/2013 | Leste et al. |
| 2006/0106990 A1* | 5/2006 | Benhase ............ G06F 12/0804 |
| | | 711/135 |
| 2011/0113202 A1 | 5/2011 | Branover et al. |
| 2013/0179713 A1 | 7/2013 | Balasubramanian et al. |
| 2013/0232363 A1* | 9/2013 | Youngs ................. G06F 1/3203 |
| | | 713/323 |
| 2014/0304475 A1 | 10/2014 | Ramanujan et al. |
| 2016/0179667 A1* | 6/2016 | Kumar ................ G06F 12/0804 |
| | | 711/135 |
| 2018/0150345 A1* | 5/2018 | Porwal ................ G06F 11/0724 |

* cited by examiner

FLUSHING DATA CONTENT IN RESPONSE TO A POWER LOSS EVENT TO A PROCESSOR

BACKGROUND

With rapid advances in technology, electronic devices are used in virtually all aspects of society today. These devices are increasing in complexity and processing capability, and processor and memory architectures implemented by electronic devices are likewise increasing in complexity and power consumption. Increases in the efficiency and capability of electronic devices will result in further widespread use and adoption of technology in nearly every facet of life.

BRIEF DESCRIPTION OF THE DRAWINGS

Certain examples are described in the following detailed description and in reference to the drawings.

DETAILED DESCRIPTION

Figure 1:
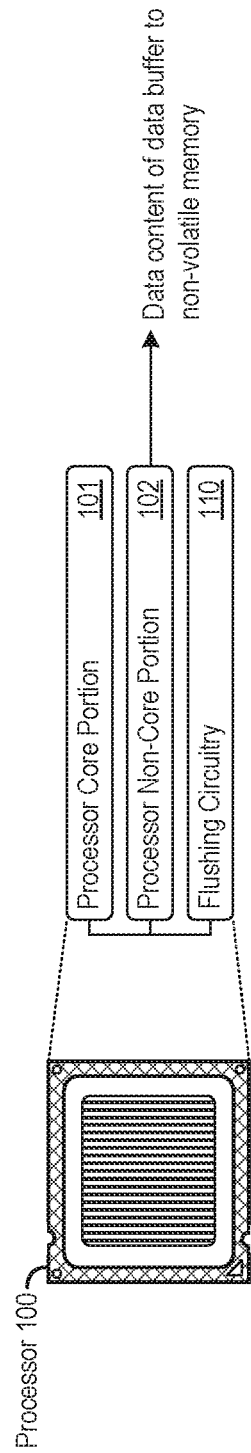
FIG. 1 shows an example of a processor that supports flushing data content in response to a power loss event.

FIG. 1 shows an example of a processor 100 that supports flushing data content in response to a power loss event. The processor 100 may include any combination of circuitry, hardware, or logic that executes instructions. Examples of the processor 100 may thus include a microprocessor with processor circuitry (e.g., multiple processor cores) implemented on a single integrated circuit (IC), an application specific integrated circuit (ASIC), a graphics processing unit (GPU), a digital signal processor (DSP), a packet processor or other network processor, an image processor, an audio processor, and more. The processor 100 may be part of any electronic device or system, examples of which include mobile telephones, tablet devices, network devices such as switches, routers, gateways, and hubs, desktop or laptop computers, audio devices, vehicle navigation systems, aviation circuitry, digital cameras, and countless more.

The processor 100 may include a processor core portion 101 and a processor non-core portion 102. The processor core portion 101 may include elements of the processor 100 that perform the execution of instructions, such as elements that form a processor core. The processor core portion 101 may include, as examples, a central processing unit, arithmetic logic unit (ALU), floating point unit (FPU), instruction fetch and decode circuitry, and more. The processor non-core portion 102 may include other elements of the processor 100 not part of a processor core, such as data buffers, processor caches (e.g., higher level caches or shared caches such as an L2 or L3 cache), memory controllers, input/output (I/O) interfaces and controllers, and more. The processor non-core portion 102 may also be referred to as the uncore of the processor 100.

The processor 100 may include flushing circuitry 110. While illustrated as separate in FIG. 1, the flushing circuitry 110 may be part of the processor non-core portion 102 of the processor 100. As described in greater detail below, the flushing circuitry 110 may identify a power loss event for a processor 100 in which the processor 100 loses power. Caches, data buffers, and other memories implemented in the processor 100 may be volatile memory, and as such lose their data content when the processor 100 loses power. In response to identifying the power loss event, the flushing circuitry 110 may selectively power part of the processor 100. The flushing circuitry 110 may do so by powering a portion of the processor that includes a particular data buffer in the processor 100 (e.g., a data cache) and by not powering another portion of the processor 100 that does not include the particular data buffer. For example, the flushing circuitry 110 may power the processor non-core portion 102 of the processor 100, but not the processor core portion 101. The flushing circuitry 110 may preserve a data state of the processor 100 by flushing data content from the particular data buffer to a non-volatile memory separate from the processor 100.

Figure 2:
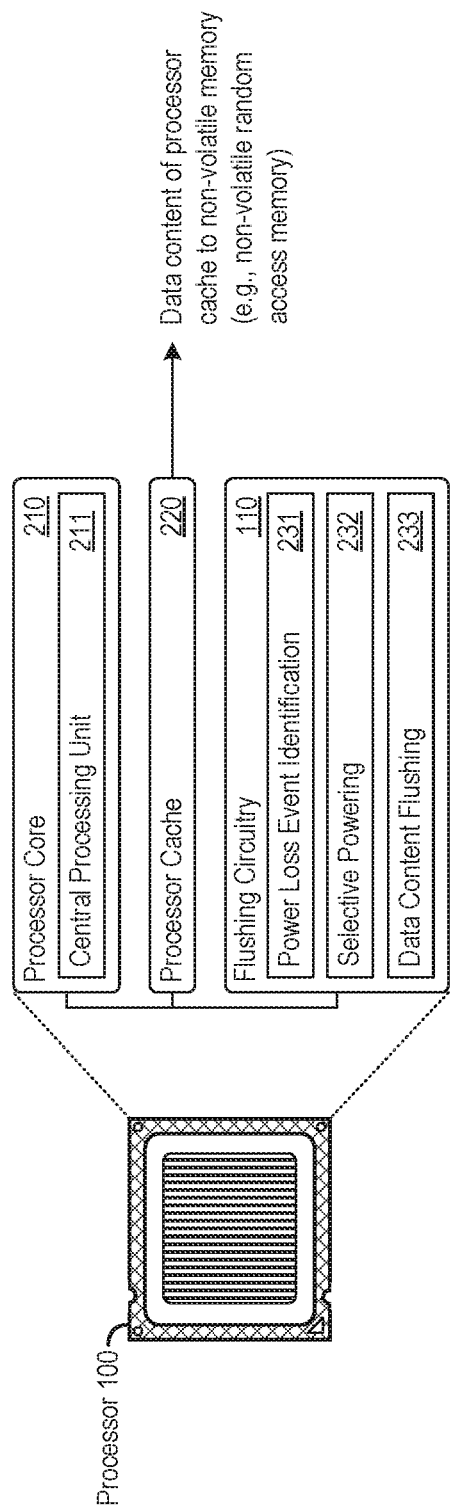
FIG. 2 shows another example of a processor that supports flushing data content in response to a power loss event.

FIG. 2 shows another example of a processor 100 that supports flushing data content in response to a power loss event. The processor 100 shown in FIG. 2 includes a processor core 210, which may include a central processing unit (CPU) 211. The processor core 210 may be part of a processor core portion 101 of the processor 100, and the processor 100 may include multiple cores as part of the processor core portion 101. The processor 100 shown in FIG. 2 also includes a processor cache 220 separate from the processor core 210. The processor cache 220 may be one of multiple caches, memories, or data buffers in the processor 100. In particular, the processor cache 220 may be implemented as volatile memory, and thus lose its data content when insufficient power is supplied to the processor cache 220. The processor cache 220 may be part of a processor non-core portion 102 of the processor 100.

The processor 100 may include flushing circuitry 110, which may include circuitry, modules, or other logic to implement any combination of functionality of the flushing circuitry 110. The flushing circuitry 110 in the example shown in FIG. 2 includes power loss event identification circuitry 231, selective powering circuitry 232, and data content flushing circuitry 233. The circuitries 231, 232, and 233 may implement various features of the flushing circuitry 110. The flushing circuitry 110 may identify a power loss event for the processor 100 (e.g., through the power loss event identification circuitry 231), selectively power the processor by providing power to the processor cache 220 but not to the processor core 210 (e.g., through the selective powering circuitry 232), and flush data content of the processor cache 220 to a non-volatile memory separate from the processor 100 (e.g., through the data content flushing circuitry 233).

The flushing circuitry 110 may identify a power loss event for the processor 100 in various ways. For example, the flushing circuitry 110 may identify a power loss event as when an amount of power supplied to the processor 100 ceases or falls below an operational threshold. In that regard, the flushing circuitry 110 may identify an expected power loss event when an electronic device the processor 100 is part of enters an expected power saving or power-off mode, e.g., in response to a shutdown command from a user. The flushing circuitry 110 may also identify an unexpected power loss event, such as when a power supply for the processor 100 experiences a hardware failure or when an electronic device is experiences a hard reset.

A power loss event to the processor 100 may cause loss of the data content stored in any volatile memory implemented by the processor 100. In response to identifying the power loss event, the flushing circuitry 110 may provide backup power to one or more volatile memories of the processor 100 to flush data content to non-volatile memory unaffected by the power loss event. The flushing circuitry 110 may selectively power the processor 100 by providing power to the volatile memory (e.g., processor cache 220) but not to other parts of the processor (e.g., the processor core 210). In doing so, the flushing circuitry 110 may optimize the power utilization of the data flushing process, as certain elements of the processor 100 are not needed to flush the data content of the processor 100. The flushing circuitry 110 may flush the data content of the processor cache 220 to a non-volatile memory separate from the processor 100. In some implementations, the flushing circuitry 110 flushes the data content of the processor cache 220 to a non-volatile random access memory (RAM) accessible to the processor 100, such as a non-volatile dual inline memory module (NVDIMM). As more examples, the non-volatile memory may be phase change memory, magnetoresistive random access memory (MRAM), resistive rand access memory (RRAM), or a memristor. The non-volatile memory may be accessible and used by the processor 100 during normal power operation of the processor 100, e.g., when the flushing circuitry 110 has not identified a power loss event.

Figure 3:
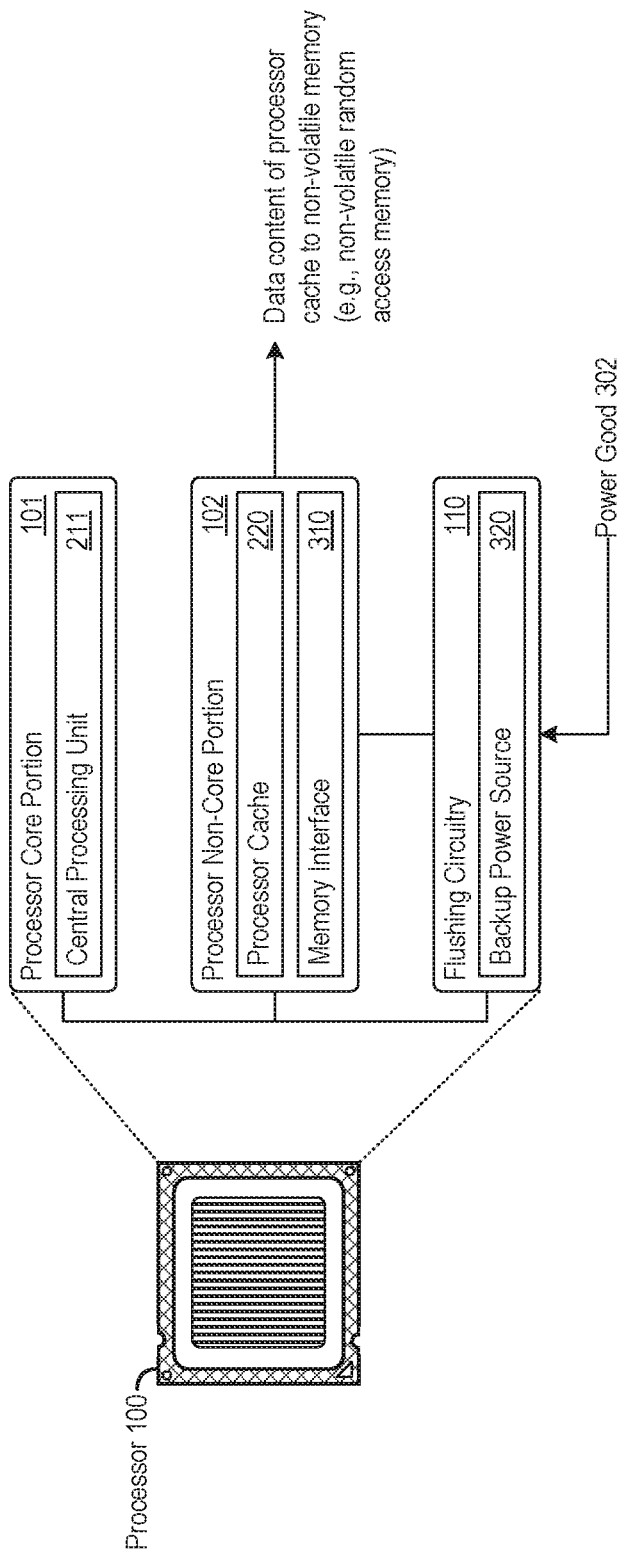
FIG. 3 shows another example of a processor that supports flushing data content in response to a power loss event.

FIG. 3 shows another example of a processor 100 that supports flushing data content in response to a power loss event. In FIG. 3, the processor 100 includes a processor core portion 101 with a CPU 211 as well as a processor non-core portion 102 with a processor cache 220 and a memory interface 310. The memory interface 310 may include I/O pins or other interface logic and circuitry to communicate data to memory external to the processor 100, such as a non-volatile RAM or NVDIMM. The processor 100 in FIG. 3 also includes flushing circuitry 110.

The flushing circuitry 110 may detect a power loss event to the processor 100 in various ways. In FIG. 3, the flushing circuitry 110 receives a power good signal 302, which may be indicative of a power supply level to the processor 100. The power good signal 302 may be generated by circuitry external to the processor 100, for example external circuitry that monitors a power supply to the processor 100 or the tracks the current passing through one or more power rails supplying power to the processor 100 (e.g., a $V_{cc}$ line). The external circuitry may assert (or de-assert) the power good signal 302 when the power provided by the power supply falls below an operational threshold value, according to which the flushing circuitry 110 may detect a power loss event to the processor 100. In some examples, the flushing circuitry 110 itself may monitor the power level to the processor 100, such as by tracking the current, resistance, or voltage of a power rail internal to the processor 100 to identify the power loss event. The power loss event may cease the supplying of power to the processor 100.

The flushing circuitry 110 may selectively provide backup power any portion of the processor 100 in response to a power loss event. In that regard, the flushing circuitry 110 may provide backup power to selected portions of the processor 100 during, after, or even before the power loss event (e.g., preemptively powering the selected portions during a planned shutdown process and prior to when power is cut off from the processor 100). One example described above includes the flushing circuitry 110 powering a processor non-core portion 102, but not a processor core portion 101. The flushing circuitry 110 may selectively power or not power any element of the processor non-core portion 102 as well. Specifically, the flushing circuitry 110 may power particular elements of the processor non-core portion 102 used to flush data content from volatile memory in the processor 100, but forego powering portions of the processor non-core portion 102, the processor core portion 101, or both that are not used in the processor data flushing process.

In some examples, the flushing circuitry 110 selectively provides power to the processor cache 220 and the memory interface 310 in response to identifying a power loss event, but not to other portions of a processor non-core portion 102. The flushing circuitry 110 may provide power to itself as well in response to the power loss event. By providing power to the processor cache 220, the flushing circuitry 110 may preserve the data content of the processor cache 220 despite the processor 100 losing power. By providing power to the memory interface 310, the flushing circuitry 110 may power the output interface to support transmitting the data content of the processor cache 220 to the non-volatile memory. By providing power to itself, the flushing circuitry 110 may function even during and after the power loss event in which a normal power source is cut off from the processor 100. The flushing circuitry 110 may instruct the processor cache 220 to flush its data contents, for example through asserting a flush signal to the processor cache 220. The processor cache 220 may flush some or all of its stored data content in response to the flush signal.

The flushing circuitry 110 may provide power to portions of the processor 100 in any number of ways. In FIG. 3, the flushing circuitry includes a backup power source 320, which the flushing circuitry 110 may activate and/or use in response to identifying the power loss event. The backup power source 320 may, for example, be a battery, capacitor, auxiliary power cell, or any other power source that provides a backup charge. During normal power operation, the flushing circuitry 110 may preserve the charge of the backup power source 320 by preventing dissipation of charge in the backup power source 320 to power elements of the processor 100.

The processor 100 may include power mechanisms to power respective portions of the processor 100. In some examples, the processor 100 includes multiple power rails to respectively supply power to the various portions of the processor 100. The power rails may receive power from a power source during normal power operation, and may thus serve as a $V_{cc}$ line to the processor 100. The flushing circuitry 110 may selectively power the processor 100 by providing backup power a particular power rail for the processor cache 220, memory interface 310, itself, or any other portion of the processor 100 the flushing circuitry 110 determines to power in response to the power loss event. The flushing circuitry 110 may determine not to power other power rails supplying power elements not used during the flushing processor, such as power rails supplying power to a processor core, CPU 211, the processor core portion 101, or other non-used elements of the processor non-core portion 102. The flushing circuitry 110 may link the backup power source 320 to a selected power rails supplying power to the processor cache 220, memory interface 310, and/or itself through any circuitry that results in a logical OR of the power states for the power rail and backup power source 320. For example, the flushing circuitry 110 may link the selected power rails to the backup power source 320 using diode circuitry, thus providing power to selected elements of the processor 100 through the power rail during normal power operation and through the backup power source 320 during or after the power loss event.

The flushing circuitry 110 may provide enough power through the backup power source 320 to complete the flushing of data content from the processor cache 220 to non-volatile memory. In some examples, the flushing circuitry 110 scales the power provided to the processor cache 220 according to a data capacity (e.g., size) of the processor cache 220. Thus, for caches or data buffers of smaller size, the flushing circuitry 110 may provide a lesser amount of backup power as the time needed to power the volatile memory and flush the data contents may be lesser than that required for volatile memories of larger size. The flushing circuitry 110 may thus account for a cache or buffer capacity when selectively powering the processor 100, which may result in increased power efficiency, lesser power consumption, and better resource utilization.

By flushing one or more data buffers in the processor 100, the flushing circuitry 110 may preserve a data state of the processor 100 which may have otherwise been lost as a result of the power loss event A data state may refer to the data content stored in the processor 100 at a given point in time.

The flushing circuitry 110 may identify any combination of data fields, types, and/or locations in the processor 100 as part of the data state. In some examples, the data state preserved by the flushing circuitry 110 includes some or all of the data content stored at a given point in the processor 100. In some examples, the data state includes the content of the data caches in the processor 100, but not the control data for control logic (e.g., not including contents of the processor register set, control bits, instruction buffer, translation lookaside buffer, trace cache, victim cache). The data cache content may also be referred to as a data cache unit (DCU), and the flushing circuitry 110 may thus determine preserve the DCU of the processor 100 by flushing the corresponding data cache(s) in the processor 100. As yet another example, the data state determined by the flushing circuitry 110 may include control data, such as data content from the processor register set and the address cache for the processor 100 (e.g. in combination with the data cache). To flush content of control data or data caches implemented as part of a processor core portion 101, the flushing circuitry 110 may provide power to the processor core portion 101, the processor non-core portion 102, or both, to preserve the data state of the processor 100.

Some portions of the data state may be duplicated in multiple memories, caches, or buffers in the processor 100. For example, the processor 100 may utilize a hierarchical caching architecture, with multiple tiers of data caches such as L1, L2, L3, and L4 data caches and so on. The multiple tiers of cache may maintain a data cache coherency, thus storing consistent data in different locations. In some examples, the processor 100 includes multiple processor cores, and the multiple cores may implement their own L1 cache, but share higher level caches such as L2 or L3 caches. The data state may be stored redundantly across the multiple cache tiers, and as one particular example collectively across the L1 caches as well as in the L3 cache.

The flushing circuitry 110 may preserve a data state for the processor 100 without flushing the data content of each cache, memory, or data buffer in the processor 100. Put another way, the flushing circuitry 110 may specifically identify one or more caches in the processor 100 storing the data state, and flush the data content of the identified cache(s) without flushing the data content of the other caches in the processor 100. Some examples of this selective cache determination and flushing are presented next.

Figure 4:
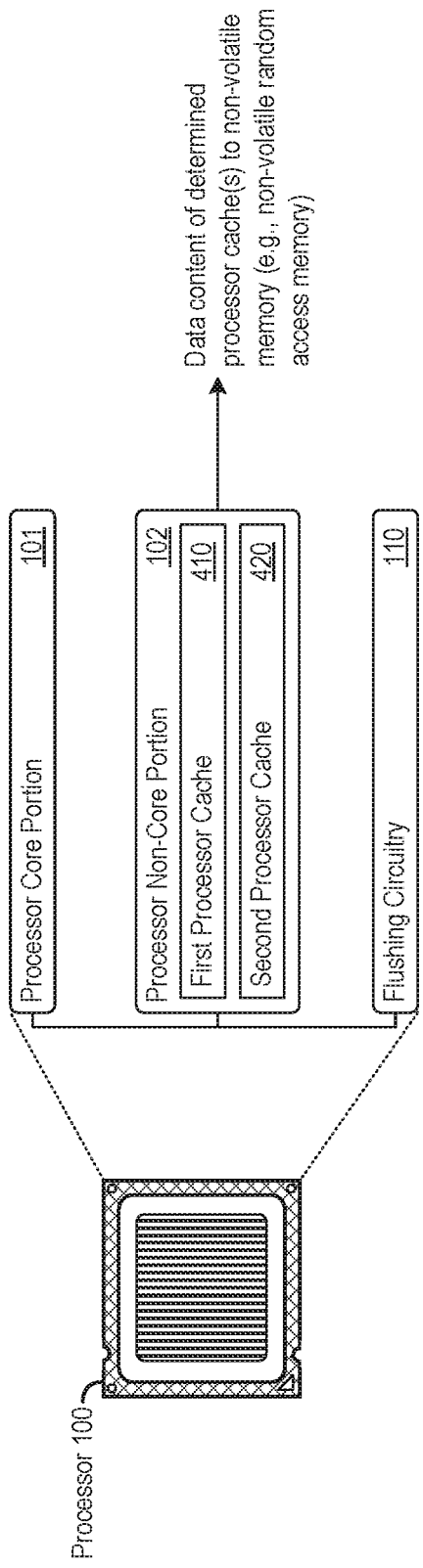
FIG. 4 shows an example of a processor that supports flushing of data content from a selected processor cache in response to a power loss event.

FIG. 4 shows an example of a processor 100 that supports flushing of data content from a selected processor cache in response to a power loss event. The processor 100 may include a processor non-core portion 102 with multiple data caches, buffers, or volatile memories. Specifically, in the example shown in FIG. 4, the processor non-core portion 102 includes a first processor cache 410 and a second processor cache 420.

The flushing circuitry 110 may identify a selected processor cache to flush according to a memory architecture implemented by the processor 100. To illustrate, the processor caches 410 and 420 may be part of a hierarchical caching architecture implemented by the processor 100. For example, the first processor cache 410 may be an L2 cache shared by multiple (e.g., 2) processor cores in the processor 100 and the second processor cache 420 may be an L3 cache shared by multiple (e.g., 8) processor cores in the processor 100. In this example, the second processor cache 420 (L3) may be characterized as a higher cache level than the first processor cache 410 (L2) according to the implemented memory architecture. The flushing circuitry 110 may determine that the second processor cache 420 stores the data state of the processor 100, but the first processor cache 410 stores some, but not all, of the data state. In this example, the flushing circuitry 110 may identify the second processor cache 420 as a selected processor cache to flush in response to a power loss event. In some implementations, the flushing circuitry 110 identifies a last level cache (LLC) as the selected processor cache to flush. The last level cache may refer to a highest cache level in the cache hierarchy before accessing data from an external memory (e.g., RAM or a hard disk). In other implementations, the flushing circuitry 110 may identify a combination of caches lower in the cache hierarchy that collectively store the data state as selected processor caches to flush.

In some implementations, the flushing circuitry 110 determines not to power non-selected data buffers, queues, or caches in the processor 100 during or after the power loss event. For example, the flushing circuitry 110 may determine not to power the first processor cache 410 of the processor non-core portion 102 in response to identifying a power loss event. In these implementations, the data content of the first processor cache 410 is lost as a result of the power loss event, though the flushing circuitry 110 may nonetheless preserve the data state of the processor 100 by flushing the data content of the second processor cache 420 to non-volatile memory.

In other implementations, the flushing circuitry 110 may provide power to a non-selected processor cache but forego flushing the data content of the non-selected processor cache. To illustrate, in FIG. 4, the flushing circuitry 110 may specifically identify the second processor cache 420 as the selected processor cache storing the data state. In response to identifying a power loss event, the flushing circuitry 110 may power the processor non-core portion 102 of the processor 100, which includes the first processor cache 410 and the second processor cache 420. Though the first processor cache 410 receives backup power after the power loss event, the flushing circuitry 110 may forego flushing the data content of the first processor cache 410, determining instead to flush the data content of the second processor cache 420 to preserve the data state. The flushing circuitry 110 may thus cause the data content of the second processor cache 420 to be transmitted to the non-volatile memory external to the processor 100 (e.g., non-volatile RAM).

Figure 5:
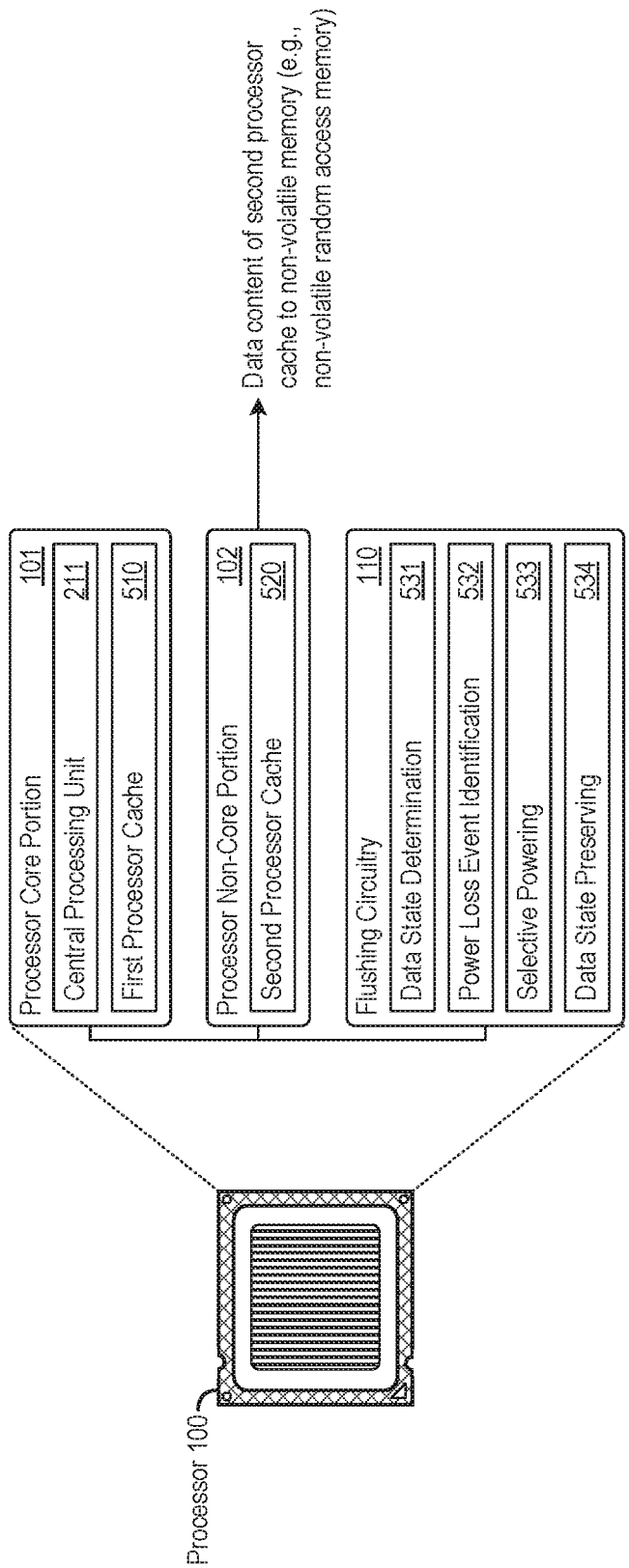
FIG. 5 shows another example of a processor that supports flushing of data content from a selected processor cache in response to a power loss event.

FIG. 5 shows another example of a processor 100 that supports flushing of data content from a selected processor cache in response to a power loss event In FIG. 5, the processor 100 includes a processor core portion 101 that includes a CPU 211 and a first processor cache 510. The first processor cache 510 may be an L1 cache implemented by a particular processor core of the processor 100. The processor 100 in FIG. 5 also includes a processor non-core portion 102 that includes a second processor cache 520. The second processor cache 520 may be an L2 or higher cache, and thus a higher cache level than the first processor cache 510.

The flushing circuitry 110 in the example shown in FIG. 5 includes data state determination circuitry 531, power loss event identification circuitry 532, selective powering circuitry 533, and data state preserving circuitry 534. The circuitries 531, 532, 533, and 534 may implement various features of the flushing circuitry 110, such as the following features. The flushing circuitry 110 may determine the second processor cache 520 as a selected processor cache storing the data state of the processor 100 (e.g., through the data state determination circuitry 531) and identify a power loss event for the processor 100 (e.g., through the power loss event identification circuitry 532). In response to identifying a power loss event, the flushing circuitry 110 may selectively power the processor 100 by providing power to the processor non-core portion 102 that includes the second processor cache 520 but not providing power to the processor core portion 101 (e.g., through the selective power circuitry 533). The flushing circuitry 110 may preserve a data state of the processor 100 by flushing data content of the second processor cache 520 to a non-volatile memory separate from the processor 100 without flushing the data content of the first processor cache 510 (e.g., through the data state preserving circuitry 534).

Figure 6:
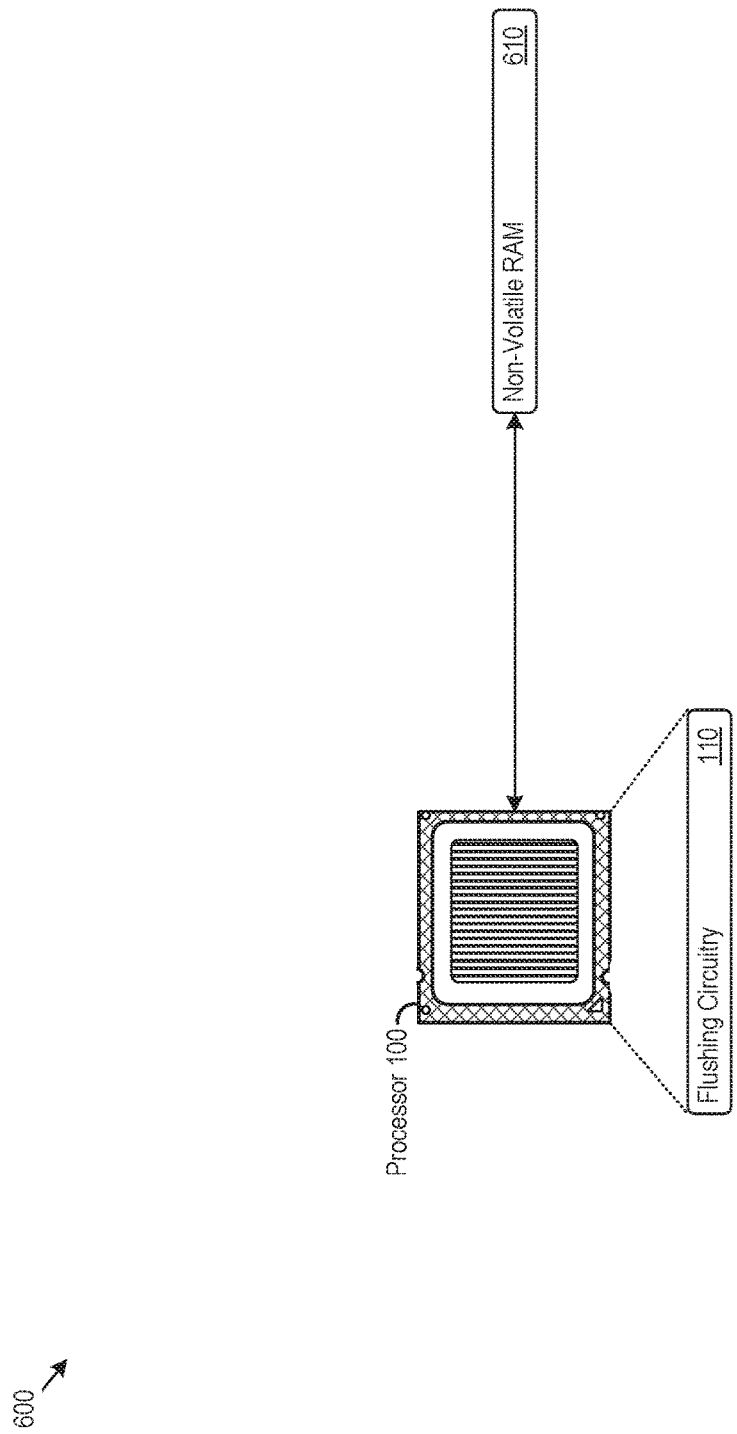
FIG. 6 shows an example of a system that supports flushing of processor data content in response to a power loss event.

FIG. 6 shows an example of a system 600 that supports flushing of processor data content in response to a power loss event. The system 600 shown in FIG. 6 includes a processor 100 that includes flushing circuitry 110 as well as a non-volatile RAM 610. The non-volatile RAM 610 may retain its data content even when not powered, and thus stored data content in the non-volatile RAM 610 is preserved even after the power loss event. In some examples, the non-volatile RAM 610 includes a NVDIMM.

The processor 100 may store, load, or otherwise access data from the non-volatile RAM 610 during normal power operation. In that regard, the non-volatile RAM 610 may be a general purpose memory used during normal power operation as well as in response to power loss events. Put another way, the non-volatile RAM 610 may not be a specific, special-purpose non-volatile memory specifically designed for use during a power loss event. By leveraging non-volatile memory already used in normal power operation, the flushing circuitry 110 may more efficiently store flushed data content from the processor 100, e.g., without having to implement specialty non-volatile memory specifically suited for preserving the data content of a processor cache in the event of a power loss to the processor 100.

The non-volatile RAM 610 may be separate from the processor 100. For example, the non-volatile RAM 610 may be different physical chip from the processor 100. Thus, the flushing circuitry 110 may flush volatiles data content of the processor 100 across a different a physical medium and unto a different physical IC. In doing so, the flushing circuitry 110 may support more efficient processor design, without having to dedicate specific space and power on the processor chip for implement non-volatile memory.

Figure 7:
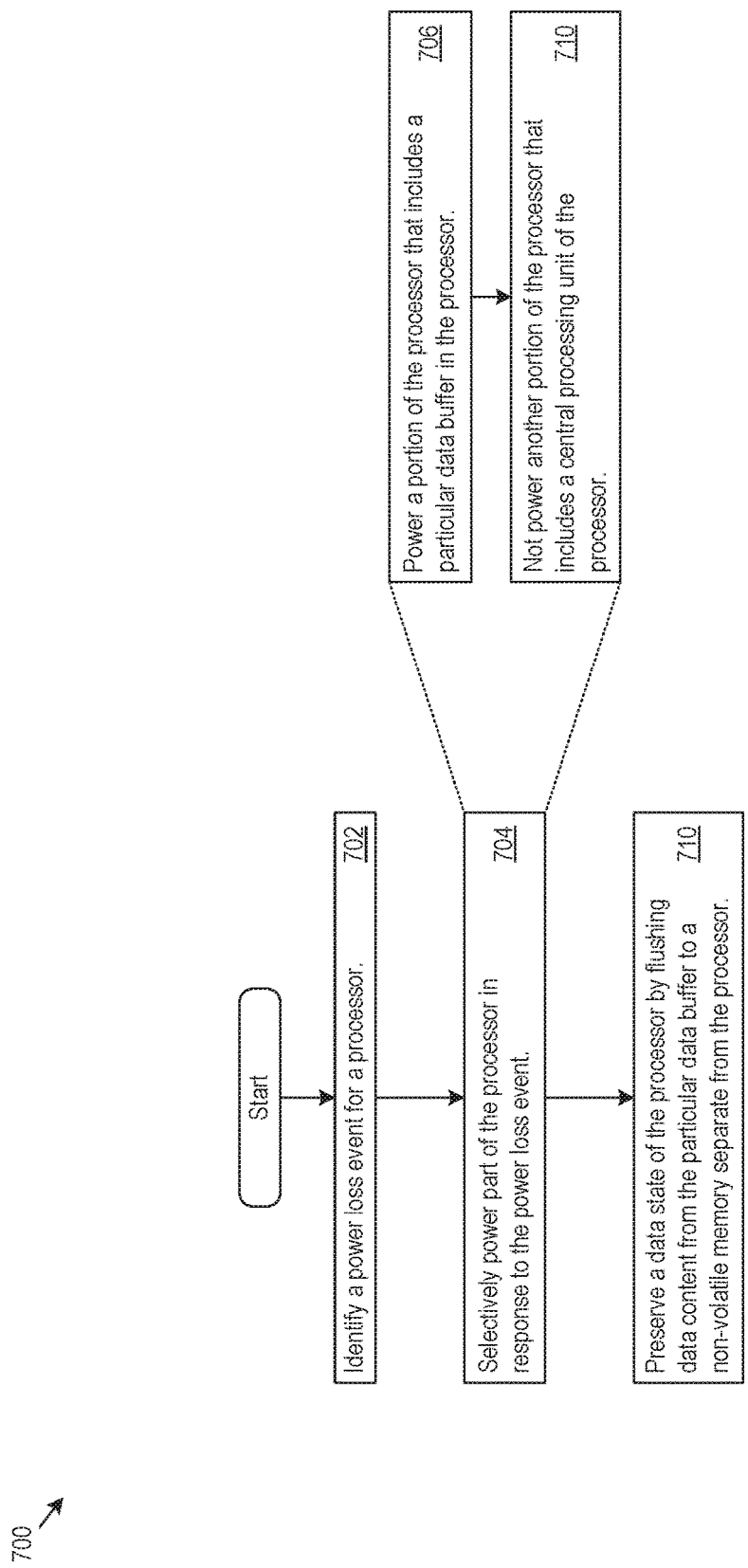
FIG. 7 shows an example of logic that the flushing circuitry may implement to flush data content in response to a power loss event.

FIG. 7 shows an example of logic 700 that the flushing circuitry 110 may implement to flush data content in response to a power loss event. The flushing circuitry 110 may identify a power loss event for a processor 100 (702) and selectively power part of the processor 100 in response to the power loss event (704).

In some examples, the flushing circuitry 110 may selectively power part of the processor 100 by powering a portion of the processor 100 that includes a particular data buffer in the processor 100 (706). The particular data buffer may be volatile memory part of a processor non-core portion 102 and/or may store the data state for the processor 100. For example, the particular data buffer may be a last level cache implemented by the processor 100, such as L3 or L4 processor cache. In selectively powering the processor 100, the flushing circuitry 110 may not power another portion of the processor 100 that includes a central processing unit 211 of the processor 100 (708), such as a processor core portion 101 of the processor 100. Then, the flushing circuitry 110 may preserve a data state of the processor 100 by flushing data content from the particular data buffer to a non-volatile memory separate from the processor 100 (710).

The flushing circuitry 110 may provide power to the particular data buffer sufficient to flush the data content of the particular data buffer. Upon ceasing to provide power to the particular data buffer, the data content of the particular data buffer may be lost. Thus, by flushing the data content of the particular data buffer to non-volatile memory, the flushing circuitry 110 may preserve the data state of the processor 100. When the processor 100 regains power (e.g., on a subsequent power up of an electronic device the processor 100 is part of), the flushing circuitry 110 may load the flushed processor data from the non-volatile memory back to the particular data buffer or any additional or alternative volatile memory from which the processor data state was flushed from. Thus, the flushing circuitry 110 may preserve the state of a processor 100 even when a power loss event causes wiping of the data content of volatile memory in the processor 100.

The flushing circuitry 110 described above may support preserving a data state of a processor 100 even when the processor loses power in a power loss event. Processor data is preserved without loss, allowing the processor 100 return to a previous state more quickly and efficiently upon a subsequent device startup. Accordingly, the flushing circuitry 110 may support a quicker and more efficient device startup process, maintain data coherency, and prevent data corruption. Moreover, in preserving volatile memory data of the processor 100, the flushing circuitry 110 may support implementation of data caches or buffers in the processor with increased size and capacity, which may result in improved processor performance and memory access efficiency. By selectively powering only a portion of the processor 100 in response to a power loss event as well as scaling the provided power according to a data capacity of volatile memory, the flushing circuitry 110 may further reduce power consumption of the processor 100 resulting in increased power efficiency.

The methods, devices, systems, and logic described above, including the flushing circuitry 110, may be implemented in many different ways in many different combinations of hardware, software or both hardware and software. For example, all or parts of the flushing circuitry 110 may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the circuitry, systems, devices, and logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the systems, devices, and circuitry described herein, including the flushing circuitry 110, may be distributed among multiple system components, such as among multiple processors, memories, and logic, optionally including multiple distributed processing systems. While various examples have been described, it will be apparent to those of ordinary skill in the art that many more implementations are possible.

Some example implementations have been described. Additional or alternative implementations are possible.

The invention claimed is:

1. A processor comprising:
   a processor core that includes a central processing unit;
   a processor cache separate from the processor core; and
   flushing circuitry to:
      identify a power loss event for the processor, the flushing circuitry to, in response to identifying the power loss event, perform both:
         selectively power the processor by causing power to be provided to the processor cache but not to the processor core; and
         flushing data content of the processor cache to a non-volatile memory separate from the processor.

2. The processor of claim 1, wherein the flushing circuitry is to flush the data content of the processor cache to a non-volatile random access memory used by the processor during normal power operation.

3. The processor of claim 1, further comprising a memory interface to the non-volatile memory; and
   wherein the flushing circuitry is to selectively power the processor by further providing power to the memory interface.

4. The processor of claim 1, wherein the flushing circuitry is further to scale the power provided to the processor cache according to a data capacity of the processor cache.

5. The processor of claim 1, further comprising multiple power rails to supply power to the processor; and
   wherein the flushing circuitry is to selectively power the processor by powering a particular power rail supplying power to the processor cache and not powering another power rail supplying power to the processor core.

6. The processor of claim 1, wherein the processor comprises multiple processor caches accessible to the processor core; and
   wherein the flushing circuitry is further to:
      specifically identify the processor cache from among the multiple processor caches in the processor as storing a data state for the processor; and
      flush the data content of the processor cache, but not data content of a different processor cache among the multiple processor caches.

7. The processor of claim 6, wherein the flushing circuitry is to selectively power the processor further by not providing power to the different processor cache.

8. A method comprising:
   identifying, by flushing circuitry, a power loss event for a processor;
   selectively powering, by the flushing circuitry, part of the processor in response to the flushing circuitry identifying the power loss event by:
      causing powering of a portion of the processor that includes a particular data buffer in the processor; and
      not causing powering of another portion of the processor that includes a central processing unit of the processor; and
   preserving, by the flushing circuitry, a data state of the processor by flushing data content from the particular data buffer to a non-volatile memory separate from the processor.

9. The method of claim 8, wherein selectively powering part of the processor further comprises powering a memory interface to the non-volatile memory.

10. The method of claim 8, wherein selectively powering part of the processor further comprises:
    specifically identifying the particular data buffer from among multiple data buffers in the processor as storing the data state of the processor; and
    not powering a different data buffer among multiple data buffers in the processor.

11. The method of claim 10, wherein specifically identifying the particular data buffer from among multiple data buffers in the processor comprises determining that:
    the different data buffers stores part, but not all, of the data state; and
    the particular data buffer stores the data state of the processor.

12. A processor comprising:
    a processor core portion that includes a central processing unit and a first processor cache;
    a processor non-core portion that includes a second processor cache; and
    flushing circuitry to:
       determine that the second processor cache stores a data state for the processor; and
       identify a power loss event for the processor, the flushing circuitry to, in response to identifying the power loss event, perform both:
          selectively power the processor by causing power to be provided to the processor non-core portion that includes the second processor cache but not causing power to be provided to to the processor core portion; and
          preserving a data state of the processor by flushing data content of the second processor cache to a non-volatile memory separate from the processor, but not flushing data content of the first processor cache.

13. The processor of claim 12, wherein the flushing circuitry is further to scale the power provided to the second processor cache according to a data capacity of the second processor cache.

14. The processor of claim 12, wherein the processor stores data according to a hierarchy of cache levels and wherein the second processor cache is a higher level than the first processor cache.

15. The processor of claim 12, wherein the flushing circuitry is to flush the data content of the first processor cache to a non-volatile random access memory used by the processor during normal power operation.

\* \* \* \* \*